United States Patent
Wustman et al.

(10) Patent No.: US 6,695,587 B2
(45) Date of Patent: Feb. 24, 2004

(54) GAS TURBINE AIRFOIL PROTECTED BY ALUMINIDE AND PLATINUM ALUMINIDE COATINGS, AND ITS PREPARATION

(75) Inventors: Roger D. Wustman, Loveland, OH (US); Antonio F. Maricocchi, Loveland, OH (US); Jonathan P. Clarke, West Chester, OH (US)

(73) Assignee: General Electric Company, Schenectady, NY (US)

( * ) Notice: Subject to any disclaimer, the term of this patent is extended or adjusted under 35 U.S.C. 154(b) by 225 days.

(21) Appl. No.: 10/139,427

(22) Filed: May 6, 2002

(65) Prior Publication Data

US 2002/0172808 A1 Nov. 21, 2002

Related U.S. Application Data

(60) Division of application No. 09/522,876, filed on Mar. 10, 2000, which is a continuation-in-part of application No. 09/373,269, filed on Aug. 11, 1999, now Pat. No. 6,254,756.

(51) Int. Cl.$^7$ .................................................. F01D 5/28
(52) U.S. Cl. .................................................. 416/241 R
(58) Field of Search ........................ 416/241 R, 241 B

(56) References Cited

U.S. PATENT DOCUMENTS

| | | | |
|---|---|---|---|
| 4,978,558 A | 12/1990 | Lamm | 427/250 |
| 5,419,971 A | 5/1995 | Skelly et al. | 428/632 |
| 5,723,078 A | 3/1998 | Nagaraj et al. | 427/142 |
| 5,902,471 A | 5/1999 | Jordan et al. | 205/122 |
| 5,985,122 A * | 11/1999 | Conner | 205/84 |
| 6,234,755 B1 | 5/2001 | Bunker et al. | 428/632 |
| 6,273,678 B1 * | 8/2001 | Darolia | 415/200 |
| 6,435,835 B1 * | 8/2002 | Allen et al. | 416/241 R |

\* cited by examiner

*Primary Examiner*—Ninh Nguyen
(74) *Attorney, Agent, or Firm*—David L. Narciso; Gregory O. Garmong

(57) ABSTRACT

A gas turbine component article has an airfoil section and is formed of a nickel-base superalloy. An unmasked region of the airfoil section has a platinum aluminide protective coating, and a masked region of the airfoil section has an aluminide coating. The platinum aluminide preferably is deposited at a trailing edge of the airfoil section that is susceptible to low-cycle fatigue damage when a platinum aluminide coating is present.

3 Claims, 2 Drawing Sheets

GAS TURBINE AIRFOIL PROTECTED BY ALUMINIDE AND PLATINUM ALUMINIDE COATINGS, AND ITS PREPARATION

"This application is a divisional of Ser. No. 09/522,876, filed on Mar. 10, 2000 and claims benefit thereto."

This application is a continuation-in-part of application Ser. No. 09/373,269, filed Aug. 11, 1999 now U.S. Pat. No. 6,254,756, for which priority is claimed.

This invention relates to protective coatings on articles, and, more particularly, to aluminide and platinum-aluminide coatings on aircraft gas turbine components having airfoils.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forwardly.

The hotter the turbine gases, the more efficient is the operation of the jet engine. There is thus an incentive to raise the turbine operating temperature. However, the maximum temperature of the turbine gases is normally limited by the materials used to fabricate the turbine vanes and turbine blades of the turbine. In current engines, the turbine vanes and blades are made of nickel-based or cobalt-based superalloys that can operate at temperatures of up to 1900–2100° F.

Many approaches have been used to increase the operating temperature limits and operating lives of the airfoils of the turbine blades and vanes. The compositions and processing of the materials themselves have been improved. The articles may be formed as oriented single crystals to take advantage of superior properties observed in certain crystallographic directions. Physical cooling techniques are used. For example, internal cooling channels may be provided within the components, and cooler air is forced through the channels during engine operation.

In another approach, a protective layer is applied to the airfoil of the turbine blade or turbine vane component, which acts as a substrate. Among the currently known diffusional protective layers are aluminide and platinum aluminide layers. The protective layer protects the substrate against environmental damage from the hot, highly corrosive combustion gases. This protective layer, with no overlying ceramic layer, is useful in intermediate-temperature applications. For higher temperature applications, a ceramic thermal barrier coating layer may be applied overlying the protective layer, to form a thermal barrier coating (TBC) system. The ceramic thermal barrier coating layer insulates the component from the exhaust gas, permitting the exhaust gas to be hotter than would otherwise be possible with the particular material and fabrication process of the substrate.

Even with the use of these protective techniques, there remain problems to overcome in extending the operating service temperatures and operating lives of the turbine blade components. For example, some portions of the airfoil have been observed to fail prematurely due to low-cycle fatigue, wherein that portion of the airfoil is subjected to repetitive, relatively large strain cycles at elevated temperature. There is a need for an approach to overcoming such problems, while retaining the benefits of the available protection techniques.

BRIEF SUMMARY OF THE INVENTION

The present invention provides a technique for reducing the susceptibility of gas turbine components to property degradation such as low-cycle fatigue failures, while retaining the benefits associated with protective coatings that are applied to the components. The present approach takes a highly selective approach to the protection of the turbine components, optimizing the performance of the protective system at various portions of the component. Expensive platinum is conserved, although this is a relatively minor benefit. The present approach may be accomplished as part of the normal production operation, without major modifications.

A method for preparing an article protected by an aluminide coating is utilized with a component article of a gas turbine having an airfoil section and comprising a nickel-base superalloy. The method includes masking a portion of the airfoil section, leaving an unmasked portion of the airfoil section, and depositing a noble metal such as platinum onto the airfoil section as a substrate. The result is that the unmasked portion has the noble metal layer thereon and the masked portion has no noble metal layer thereon. The mask is removed, and an aluminum-containing layer is deposited onto the airfoil section of the article. Typically the noble metal, the aluminum-containing layer, and the substrate material are interdiffused. A ceramic layer may be deposited over the aluminum-containing layer, to form a thermal barrier coating.

In the preferred application of the present invention, the selective use of the noble metal allows a reduction in premature failures due to low-cycle fatigue. The application is based upon the recognition that platinum enhances the attraction of aluminum to the coating. For a part coated in an atmosphere of constant aluminum activity, the area with platinum will coat thicker and have a higher total aluminum content than an area without platinum. Thick coatings are more prone to mechanical property degradation such as low-cycle-fatigue cracking. The incidence of low-cycle fatigue damage may be lessened in some areas of the airfoil by using an aluminide protective coating rather than a platinum aluminide protective coating.

Consistent with this approach, an area of the article that is subject to mechanical property degradation such as low-cycle fatigue damage is identified. The masked portion includes the area of the article that is subject to such mechanical property degradation in the form of low-cycle fatigue damage. A region of particular concern is the portion of the airfoil adjacent to a trailing edge of the airfoil, and most particularly the trailing edge adjacent to a platform portion of the turbine component. The trailing edge region adjacent to the platform experiences less severe temperatures than the leading edge-region, so the use of the aluminide coating at the trailing edge root is sufficient from a protection standpoint.

The result is an article protected by an aluminide coating, comprising a nickel-base superalloy substrate in the form of a gas turbine component article having an airfoil section, a platinum aluminide coating in an unmasked portion of the airfoil, and an aluminide coating in a masked portion and in the unmasked portion of the airfoil. The masked portion is the portion of the airfoil that is identified as most susceptible to mechanical property degradation in the form of low-cycle fatigue damage. In the case of most interest, this portion is the trailing edge root of the airfoil, as discussed above.

The present approach thus provides a technique for selectively coating the gas turbine component to protect the component yet to reduce the incidence of property degradation such as low-cycle fatigue failures. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
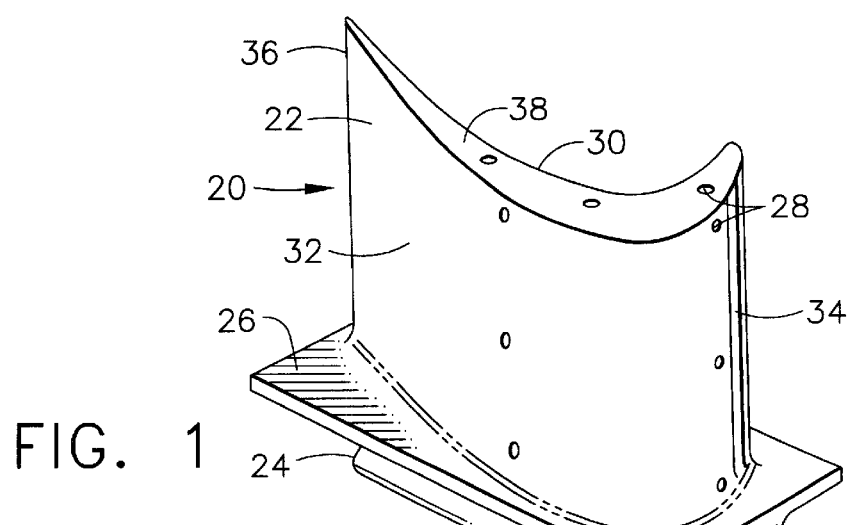
FIG. 1 is a perspective view of the convex side of a turbine blade.
Figure 2:
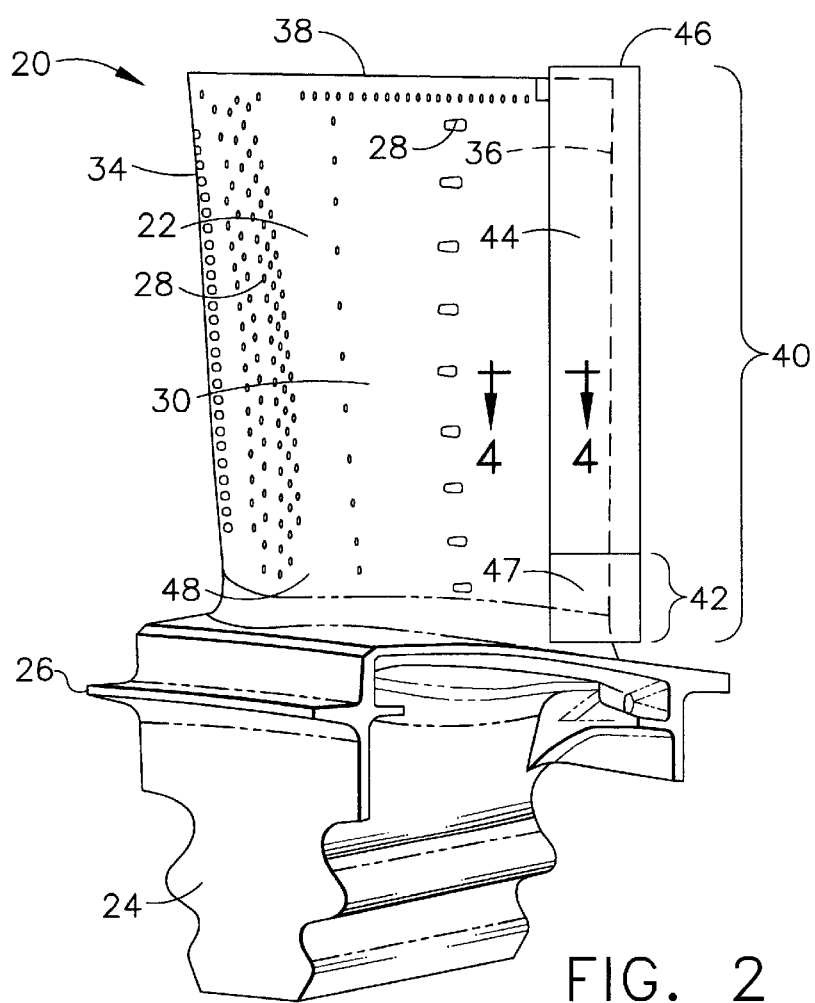
FIG. 2 is a perspective view of the concave side of the turbine blade.

FIGS. 1 and 2 depict a component article of a gas turbine engine such as a turbine blade or turbine vane, and in this illustration a turbine blade 20. FIG. 1 is the view of the convex side, and FIG. 2 is the view of the concave side. The turbine blade 20 includes an airfoil 22 against which the flow of hot exhaust gas is directed. (The turbine vane has a similar appearance in respect to the pertinent airfoil portion.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 meets the dovetail 24. In some articles, a number of cooling channels extend through the interior of the airfoil 22, ending in openings 28 in the surface of the airfoil 22. A flow of cooling air is directed through the cooling channels, to reduce the temperature of the airfoil 22.

As illustrated, the airfoil 22 portion of the turbine blade 20 is curved in an airfoil shape. There is a concavely curved side, termed the concave side 30 (also sometimes known as the "pressure" side of the airfoil), and a convexly curved side, termed the convex side 32 (also sometimes known as the "suction" side of the airfoil). A curved leading edge 34 separates the concave side 30 from the convex side 32 along one longitudinal margin of the airfoil 22. A more sharply defined trailing edge 36 separates the concave side 30 from the convex side 32 along the other longitudinal margin of the airfoil 22. The airfoil 22 terminates in a tip 38 remote from the dovetail 24. In service, the pressurized hot combustion gas from the combustors is directed against the concave side 30. This concave side 30 therefore requires more protection against the incident hot combustion gas than does the convex side 32. To provide this protection, at least a portion of the concave side 30 is coated with a protective coating, either in the form of an environmental coating or a thermal barrier coating.

Figure 3:
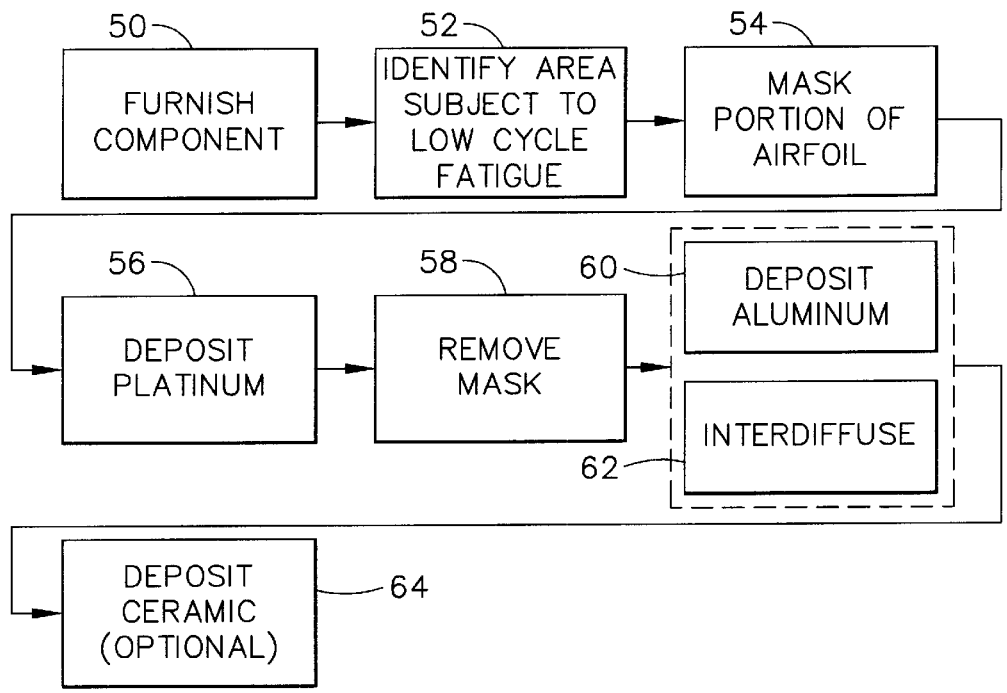
FIG. 3 is a block flow diagram of a preferred method for practicing the invention.

FIG. 3 depicts an approach for preparing an article such as the turbine blade 20. The component article is furnished, numeral 50, in the preferred case the turbine blade 20 or a turbine vane. The component article includes the airfoil 22. The component article is made of a nickel-base superalloy. "Nickel base" means that the article has more nickel than any other element, on a weight percentage basis. The superalloy typically includes gamma-prime forming elements, and is strengthened by the precipitation of gamma-prime (nominally $Ni_3(Al, Ti)$) phase in a gamma nickel solid solution matrix.

Any operable material may be used as the substrate article. The preferred nickel-base superalloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene' 142, which has a nominal composition in weight percent of about 6.8 percent chromium, 12.0 percent cobalt, 1.5 percent molybdenum, 2.8 percent rhenium, 1.5 percent hafnium, 6.15 percent aluminum, 4.9 percent tungsten, 6.35 percent tantalum, 150 parts per million boron. 0.12 percent carbon, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

An area to be masked is identified. In the illustrated preferred approach, this identification is made on the basis of considerations of mechanical property degradation such as potential low-cycle fatigue susceptibility of regions coated with a platinum aluminide coating, numeral 52. The inventors have observed that certain areas of the turbine blade that are coated with a platinum aluminide coating are potentially susceptible to mechanical property degradation in the form of low-cycle fatigue damage. These areas include a portion 40 of the concave side 30 near the trailing edge 36. The problem is most acute in a root portion 42 of the concave side 30 near the trailing edge 36, and adjacent to the top side of the platform 26. The potential susceptibility to low-cycle fatigue damage arises when the portion 40 and/or the root portion 42 are coated with a platinum aluminide coating, but is minimized by an aluminide coating that contains little if any platinum or other noble metal. Accordingly, the portions 40 and/or 42 are identified as the areas to be masked.

Other criteria may be used instead in particular situations. For example, it may be necessary to cover the ends of the opening 28 to prevent deposition therein and into the internal passages.

A masked portion 44 of the airfoil is masked, numeral 54. As noted, in the preferred approach the masked portion is preferably either the portion 40 or the root portion 42. Masking is accomplished by any operable technique that will prevent the deposition of platinum into the masked portion. The deposition of platinum is preferably accomplished by an electrodeposition process as will be described subsequently, and any operable masking technique that will prevent deposition of platinum on the masked portion 44 may be used. For example, the masked portion 44 may be covered with a physical mask such as an illustrated plastic clip 46 of the appropriate size, or with a trailing edge comb and mask made of plastic. The masked portion 44 may instead be covered with a maskant 47 applied to the surface of the article, such as a lacquer, tape, or wax. The masking of the masked portion 44 defines the masked portion 44 and an unmasked portion 48.

Figure 4:
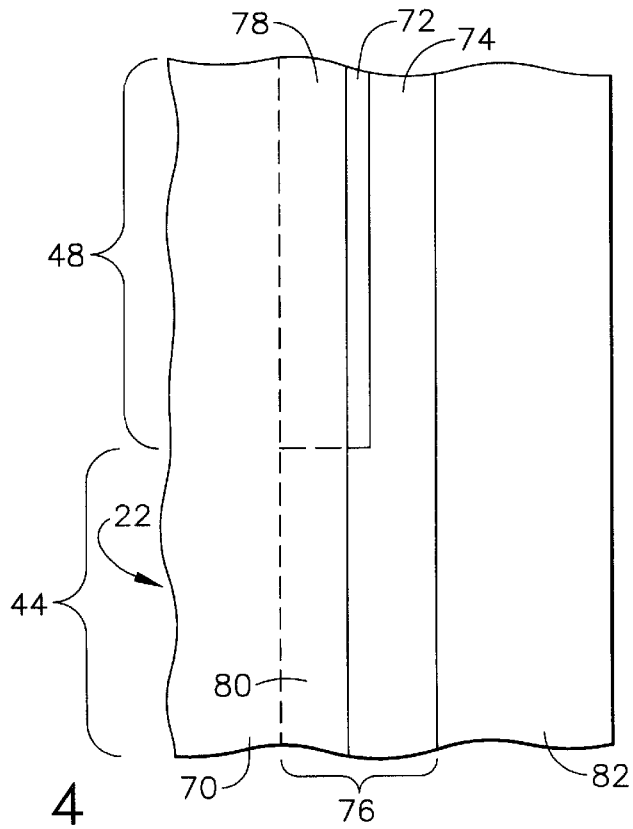
FIG. 4 is a schematic enlarged sectional view through the airfoil of the turbine blade, taken along line 4—4 of FIG. 2 and illustrating both the region coated with platinum aluminide and the region coated with an aluminide.

A layer of a noble metal, which may be platinum or other noble metal such as palladium or rhodium, is deposited, numeral 56, onto the airfoil 22, which thereby serves as a substrate 70. FIG. 4 illustrates the resulting structure, after the mask has been removed. The platinum layer 72 overlies the unmasked portion 48. There is no platinum layer overlying the masked portion 44. The deposition is preferably accomplished by placing a platinum-containing solution into a deposition tank and depositing platinum from the solution onto the substrate 70, which is the airfoil 22. In the deposition, the platinum layer 72 is deposited onto the unmasked portion 48 of the substrate 70, but not only the masked portion 44. An operable platinum-containing aqueous solution is $Pt(NH_3)_4HPO_4$ having a concentration of about 4–20 grams per liter of platinum, and the voltage/current source is operated at about ½–10 amperes per square foot of facing article surface. The platinum layer 72, which is preferably from about 1 to about 6 micrometers thick and most preferably about 5 micrometers thick, is deposited in 1–4 hours at a temperature of 190–200° F.

After the platinum layer 72 is deposited, the mask is removed, numeral 58. Where the mask is a separate article such as the plastic clip 46, it is simply lifted away. Where the mask is an overlay maskant 47 such as a lacquer, tape, or wax, it is stripped away mechanically, chemically with a solvent, or physically by melting.

An aluminum-containing layer 74 is deposited, numeral 60, overlying both the (previously) masked portion 44 and the unmasked portion 48. The aluminum layer 38 is deposited by any operable approach, with vapor deposition preferred. In that approach, a hydrogen halide gas, such as hydrogen chloride or hydrogen fluoride, is contacted with aluminum metal or an aluminum alloy to form the corresponding aluminum halide gas. Other elements may be doped into the aluminum layer from a corresponding gas, if desired. The aluminum halide gas contacts the airfoil 22, depositing the aluminum thereon. The deposition occurs at elevated temperature such as from about 1825° F. to about 2050° F. during a 4 to 20 hour cycle. The aluminum layer 74 is preferably from about 12 to about 125 micrometers thick. The deposition technique allows alloying elements to be co-deposited into the aluminum layer 74 if desired, from the halide gas. In this process, the aluminum layer 38 is also deposited on the convex side 32. Such deposition of aluminum on the convex side 32 is not harmful, and in fact forms a beneficial diffusion aluminide layer on the convex side 32 which resists oxidation in this less demanding region of the article. Aluminum is inexpensive.

Because the deposition of aluminum is performed at elevated temperature, the deposited aluminum atoms interdiffuse with the platinum layer 34 (or interdiffused platinum/substrate region) and the material of the substrate 70, numeral 62, forming a diffusion zone 76. A diffusion subzone 78 formed from interdiffusion of the platinum layer 72, the aluminum layer 74, and the substrate 70 contains platinum, aluminum, and elements found in the substrate, primarily nickel because nickel is the primary component of the substrate. A diffusion subzone 80 formed from interdiffusion of the aluminum layer 74 and the substrate 70 contains aluminum and elements found in the substrate, primarily nickel because nickel is the primary component of the substrate. A significant amount of interdiffusion of the layers is achieved during the aluminum deposition step 60. Additional interdiffusion may be accomplished if desired by maintaining the structure at elevated temperature after the flow of halide gas is discontinued.

If further protection is required because the airfoil is to be used at very high temperatures, a ceramic layer 82 may be deposited, numeral 64, overlying the aluminum-containing layer 74. The ceramic layer 40 is typically applied only over the concave side 30 and thence over the interdiffused platinum-aluminide coating, but it could be applied over the convex side 32 if desired. The ceramic layer 82 may be applied by any operable technique, with electron beam physical vapor deposition (EB-PVD) being preferred for the preferred yttria-stabilized zirconia coating. The EB-PVD processing may be preceded and/or followed by high-temperature processes that may affect the distribution of elements in the bond coat. The EB-PVD process itself is typically conducted at elevated temperatures.

The final protected article has a platinum aluminide coating covering the unmasked area 48, which in the preferred case is most of the concave side 30 of the airfoil 22. A (non-platinum) aluminide, often termed a nickel aluminide, covers the masked area 48, which in the preferred case is one of the portions 40 or 42 adjacent to the trailing edge 36 of the concave side 30.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article protected by an aluminide coating, comprising:

a substrate in the form of a gas turbine component article having an airfoil section, the component comprising a nickel-base superalloy;

a platinum aluminide coating in an unmasked region of the airfoil section; and an aluminide coating in a masked region and the unmasked region of the airfoil section.

2. The article of claim 1, wherein the masked portion is at a trailing edge of the airfoil section.

3. The article of claim 1, wherein the masked portion is at a trailing edge adjacent to a platform of the airfoil section.

* * * * *